United States Patent
Bedin

[11] Patent Number: 5,261,207
[45] Date of Patent: Nov. 16, 1993

[54] MACHINES FOR THE TREATMENT OF BOTTLES

[75] Inventor: Jean Bedin, Camblanes, France

[73] Assignee: Etablissements Larrieu-Bedin, France

[21] Appl. No.: 904,165

[22] Filed: Jun. 25, 1992

[30] Foreign Application Priority Data

Jun. 25, 1991 [FR] France .................. 91 07795

[51] Int. Cl.$^5$ .................. B65B 43/50; B65B 43/52; B65B 43/60
[52] U.S. Cl. .................. 53/284.5; 53/276; 53/308; 198/480.1; 198/481.1
[58] Field of Search ............ 53/317, 510, 276, 277, 53/282, 367, 368, 308, 284.5; 198/480.1, 481.1

[56] References Cited

U.S. PATENT DOCUMENTS

| | | | |
|---|---|---|---|
| 2,713,960 | 7/1955 | Siegal | 198/481.1 X |
| 2,795,090 | 6/1957 | Sterna | 198/481.1 X |
| 3,018,006 | 1/1962 | Zilahy | |
| 3,957,154 | 5/1976 | Shiba | 198/481.1 X |
| 4,114,347 | 9/1978 | Morris et al. | 198/481.1 X |
| 4,230,219 | 10/1980 | Pezzin et al. | 198/480.1 X |
| 4,624,098 | 11/1986 | Trendel | 198/480.1 X |
| 4,909,377 | 3/1990 | Bernhard | 198/481.1 X |

FOREIGN PATENT DOCUMENTS

| | | | |
|---|---|---|---|
| 256550 | 8/1988 | European Pat. Off. | |
| 1283112 | 11/1968 | Fed. Rep. of Germany | |
| 61-624 | 4/1986 | Japan | |
| 0117129 | 5/1989 | Japan | 198/480.1 |

*Primary Examiner*—Horace M. Culver
*Attorney, Agent, or Firm*—Rosenman & Colin

[57] ABSTRACT

In a machine for processing bottles of different sizes, an arrangement for converting the machine to process bottles of one of the sizes, comprises a star wheel rotatable about an axis and having radially open pockets to which upright bottles having necks at a predetermined elevation are conveyed. The star wheel is axially adjusted along the axis to position the pockets at the predetermined elevation. The necks are held in the pockets by an endless belt having a segment that engages and presses the necks into the pockets.

13 Claims, 1 Drawing Sheet

MACHINES FOR THE TREATMENT OF BOTTLES

BACKGROUND OF THE INVENTION

The present invention concerns machines for the treating of bottles, in particular filling, stoppering, capsuling and labeling machines in which the bottles fed or removed via conveyor are preselected and then selected by a compartment wheel or spider, which places them on or removes them from the treatment line. Stationary guides assure the guiding of the bottles in contact with said spider, the compartments of the spider and the guides being adapted to the shapes of the body of the bottles.

Adaptation of the machine to bottles of different formats is effected at present by replacing the spiders and the guides, thereby requiring disassembly and the storing of tools and therefore a loss of time and space.

SUMMARY OF THE INVENTION

The present invention is directed precisely at avoiding these losses by a machanism in which the grasping of the bottles is effected at their necks the diameters of which, contrary to their body, differ little from one type of bottle to another. The mechanism comprises at least one endless belt which passes over guide pulleys arranged in such a manner as to enable the belt to follow along the peripheral zone of the said spider moved over by the bottles, elastic return means adapted to assure the tensioning of the belt, means for adjusting the height of said spider in order to adapt it to the level of the necks of the bottles, and means for adjusting the height of the belt guide pulleys.

It is obvious that the mechanism of the invention is very simple and avoids any change of the parts or tools, whatever the format of the bottles.

In many cases, the treatment machine comprises an entrance spider which selects the bottles to be treated and an exit spider which removes the treated bottles.

In these cases, it is advantageous that a single endless belt cooperate with the entrance and exit spiders and that the guide pulleys be supported by a common plate.

It is also advantageous then to provide a common height-adjustment means for the two spiders and the plate bearing the belt guide pulleys. For this purpose, said plate and the spiders can be made integral in height with a sliding shaft of adjustable height, for instance by means of a common screw.

BRIEF DESCRIPTION OF THE DRAWINGS

By way of illustration and not of limitation, one embodiment of a mechanism in accordance with the invention is shown in the accompanying drawing, in which.

DETAILED DESCRIPTION OF THE PREFERRED EMBODIMENT

Figure 1:
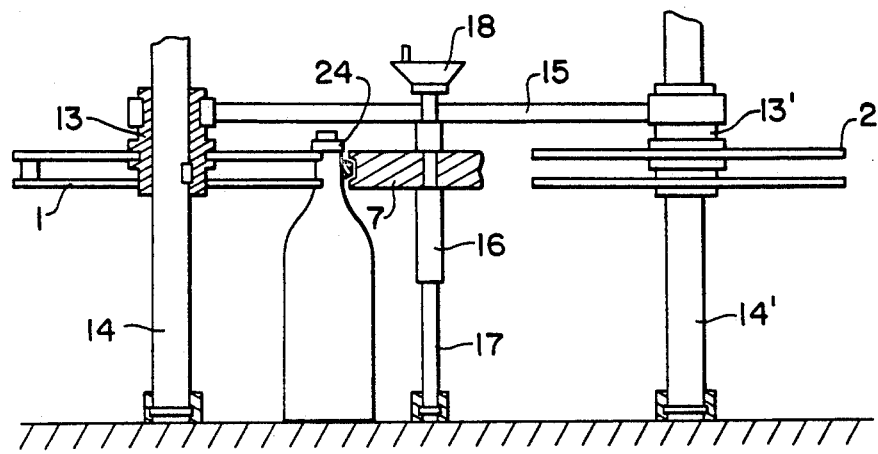
FIG. 1 is a simplified view, partially in section.
Figure 2:
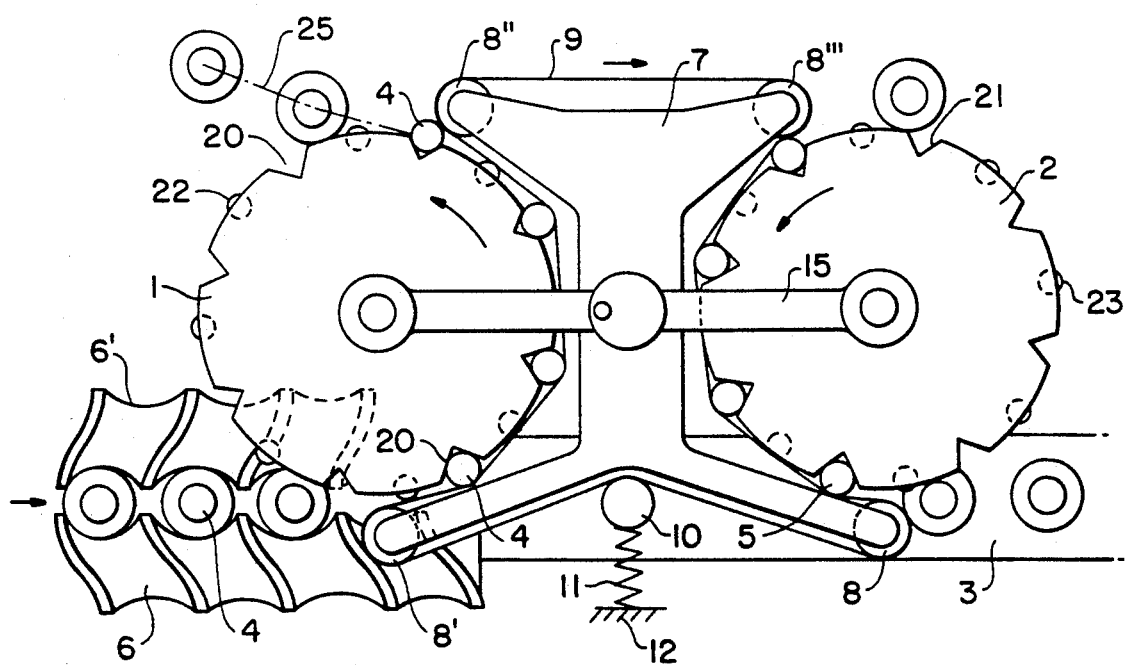
FIG. 2 is a top view of the mechanism.

In this embodiment, the entrance spider 1 and the exit spider 2 are shown, as well as the conveyor 3 for feeding the untreated bottles 4 and evacuating the treated bottles 5. Before being taken up by the entrance spider 1, the bottles 4 are selected by two opposite screws 6, 6'. A horizontal plate 7 bears four guide pulleys 8, 8', 8", 8"' over which there passes an endless V-belt 9, the tension of which is controlled by a roller 10 subjected to the action of a spring 11 which is attached to the frame 12 of the mechanism.

The spiders 1 and 2 are borne by respective sleeves 13, 13' mounted slidably on vertical shafts 14, 14' and connected by a common arm 15 borne by a sleeve 16 which is mounted slidably on a screw 17 which is controlled by the wheel 18. The plate 7 is also firmly attached to the sleeve 16.

The two spiders have a periphery which defines V-shaped compartments 20, 21, small rollers 22, 23 being provided between these compartments.

The operation of the mechanism described is immediately evident from the above.

The bottles 4, fed by the selection screws 6, 6', are grasped by their necks between the V-shaped compartment 20 and the belt 9 which, tensioned under the action of the spring 11, is driven by the spiders 1, 2 and wedges the neck of the bottle in a V-shaped compartment 20 of the spider 1 until the bottle arrives on the treatment line 25. The belt 9 rests against grooved rollers 22, 23.

After treatment, the bottles are grasped by the exit spider in the same manner as by the entrance spider and deposited on the removal conveyor 3.

The adjustment in height of the two spiders 1, 2 and of the belt 9 is effected simply by turning the wheel 18 in order to adapt them also to the different heights of bottles so that they are grasped by their necks without having to take into account also the bodies of the bottles.

I claim:
1. In a machine for processing bottles of different sizes, an arrangement for converting the machine to process bottles of one of said sizes, the arrangement comprising:
 (a) a star wheel rotatable about, and having a peripheral surface concentric with, an axis of rotation, said star wheel having pockets radially open at the peripheral surface;
 (b) means for conveying upright bottles having necks at a predetermined elevation to the star wheel;
 (c) means for axially adjusting the star wheel along the axis to position the pockets at said predetermined elevation for receiving the necks in the pockets; and
 (d) means for holding the necks in the pockets, including an endless, tensioned element having a segment radially spaced from, and guided for movement along, a portion of the peripheral surface, said segment engaging and pressing the necks into the pockets at said predetermined elevation.
2. The arrangement according to claim 1, wherein the pockets are uniformly spaced about the axis.
3. The arrangement according to claim 1, wherein the star wheel has a central hub mounted for sliding movement on a wheel shaft extending along the axis.
4. The arrangement according to claim 3, wherein the holding means includes a plate having thereon a set of guide rollers over which the tensioned element is guided.
5. The arrangement according to claim 4, wherein the plate has a sleeve mounted for axial movement on a shaft extending along a sleeve axis generally parallel to the axis of rotation of the star wheel.
6. The arrangement according to claim 5, wherein the adjusting means includes a turnable actuator and an arm interconnecting the plate and the hub for joint movement.

7. The arrangement according to claim 1, wherein the tensioned element is a belt.

8. The arrangement according to claim 7, wherein the holding means includes means resiliently engaging the belt for tensioning the belt.

9. The arrangement according to claim 1, wherein the star wheel is rotatable in one circumferential direction about the axis of rotation; and further comprising another star wheel rotatable in an opposite circumferential direction about another axis that is generally parallel to said axis of rotation, said other star wheel having other pockets radially open at a peripheral surface thereof; and means for discharging additional upright bottles having necks at a common elevation away from the other star wheel.

10. The arrangement according to claim 9, wherein the adjusting means is also operative for adjusting the other star wheel along the other axis to position the other pockets at said common elevation for receiving the necks of the additional bottles in the other pockets, and wherein the tensioned element has another segment radially spaced from, and guided for movement along, a portion of the peripheral surface of the other star wheel, said other segment engaging and pressing the necks of the additional bottles into the other pockets at said common elevation.

11. The arrangement according to claim 10, wherein the star wheel has a central hub mounted for movement on a first wheel shaft extending along the axis of rotation, and wherein the other star wheel has a central sleeve mounted for movement on a second wheel shaft extending along the other axis.

12. The arrangement according to claim 11, wherein the holding means includes a plate having thereon a set of guide rollers over which both segments of the tensioned element are guided.

13. The arrangement according to claim 12, wherein the adjusting means includes a turnable actuator and a common arm interconnecting the plate, the sleeve and the hub for joint movement.

* * * * *